United States Patent [19]

Vesely et al.

[11] Patent Number: 5,431,946
[45] Date of Patent: Jul. 11, 1995

[54] MULTI-FLAVORED PASTA FILATA CHEESE DAIRY PRODUCT AND PROCESS FOR PREPARING THE SAME

[76] Inventors: Marco E. Vesely; Leonardo Vesely, both of Via S.Orsola, 11 Milan, Italy

[21] Appl. No.: 162,575

[22] Filed: Dec. 3, 1993

Related U.S. Application Data

[63] Continuation-in-part of Ser. No. 861,957, Apr. 2, 1992, abandoned.

[30] Foreign Application Priority Data

Apr. 23, 1991 [IT] Italy .................. MI91A1126

[51] Int. Cl.$^6$ .............................. A23C 19/09
[52] U.S. Cl. ..................... 426/582; 426/36; 426/38; 426/42; 426/656
[58] Field of Search ............ 426/582, 656, 36, 38, 426/42

[56] References Cited

U.S. PATENT DOCUMENTS 2,730,447  1/1956  Buyer ................................ 426/656
4,919,943  4/1990  Yee et al. ............................ 426/39

FOREIGN PATENT DOCUMENTS 1678274  9/1991  U.S.S.R. .............................. 426/582
1757570  8/1992  U.S.S.R. .............................. 426/582

OTHER PUBLICATIONS

Kosikowski, F., 1966, Cheese and Fermented Milk Foods, Published by Kosikowski, Distributed by Edward Brothers, Inc., Ann Arbor Mich. pp. 202, 203.
Modern Dairy Technology, vol. 2, "Advances in Milk Products" by R. K. Robinson, Elsevier Applied Science, 1986, pp. 206–208.

Primary Examiner—Helen Pratt
Attorney, Agent, or Firm—Laff, Whitesel, Conte & Saret, Ltd.

[57] ABSTRACT

A process of making pasta filata cheese in which a ripened curd is combined with chopped ingredients and stretched (filatura) in a "filatura" liquid which can be mainly water at 60°–95° C., after which is product is formed, cooled, hardened and packaged.

12 Claims, No Drawings

MULTI-FLAVORED PASTA FILATA CHEESE DAIRY PRODUCT AND PROCESS FOR PREPARING THE SAME

This is a continuation-in-part of application Ser. No. 07/861,957, filed Apr. 2, 1992, now abandoned.

FIELD AND BACKGROUND OF THE INVENTION

The present invention relates to a new multi-flavored dairy product comprising pasta filata cheese having ingredients homogenously distributed, dispersed and intimately incorporated and bound therein. More particularly, the present invention relates to a multi-flavored dairy product obtained by adding to the cheese, during the "filatura" step, ingredients of vegetable and/or animal source, selected from the group consisting of fruit, vegetables, meat, spices, farinaceous food, greens and the like. This invention relates moreover to a process for producing said dairy product as well as and its use in stuffing food, for example pizza, savoury flans and cakes, as a "filler" for pasta, gastronomic preparations and sandwiches, or as a true flavouring for typical dishes such as spaghetti, macaroni and the like.

With "pasta filata cheese" all products having a substantially identical production scheme are meant, said scheme being characterized by a technological step involving kneading in hot water, that is the property of casein to be "stretched" into rope-like strand or reduced into filaments or thin threads at a particular moment of the pasta filata manufacturing and under particular acidity and temperature conditions, that is when the curd has become "ripe".

Curd ripening is a phenomenon of partial retexturing of the casein reticule carried out by lactic acid produced by lactic fermentation or by added organic acids acting so as to catch calcium contained in calcium phosphocaseinate and demineralize it.

Anyway, the term "pasta filata" includes several varieties of cheeses having variable shapes and sizes, requiring ripening periods ranging from some hours in case of mild soft cheese (mozzarella, fiordilatte) to some days in case of semisoft cheese (provola) and up to 5-6 months or one year for semihard cheese (provolone).

In any case, when pasta filata type products are mentioned, it is necessary to distinguish between soft or semisoft products (buffalo milk mozzarella, fiordilatte, scamorza, provola) and hard products (caciocavallo, provolone, burrino). So buffalo milk mozzarella is an unripened soft foodstuff exclusively obtained with whole buffalo milk, is in the shape of a ball, and its rind should be very thin, soft and edible and should be easy to peel off from the main piece. On the other hand, "Fiordilatte" is a soft cheese made from cow's milk and generally is in the shape of spheroids and ovals.

In general terms, it is possible to state that all pasta filata cheeses are obtained by a working scheme essentially comprising the following steps: milk treatment, acidification (by adding ferments or organic acids such as citric acid), addition of rennet, curdling, cutting of the curd, extraction of whey, kneading and stretching in hot water ("filatura"), shaping, cooling and stiffening, packaging with or without a conservation (preserving) liquid of the final product. Therefore, differences that can be found in the different preparations are due to the kind of milk used and to the variation of technology adopted, and the products thus obtained are quite similar to one another.

In U.S. Pat. No. 8,730,447, issued on Jan. 10, 1956, R. A. Boyer describes a process for the manufacture of edible protein fibers for use in food products which comprises forming a dispersion of a protein in a dispersing medium, adding to said dispersion a small amount of a modifying agent, and thereafter forcing the dispersion containing said modifying agent through an orifice into a coagulation bath to produce a quantity of fine protein filaments each containing said modifying agent substantially uniformly distributed throughout. The main purpose was to produce a meat substitute.

From U.S. Pat. No. 4,919,943 issued on Apr. 24, 1990, a process for making a pasta filata cheese with casein having bound calcium in the range from about 1000 mg to about 300 mg per 100 g of casein and soluble proteins is known, said process comprising the steps of modifying soluble proteins to reduce reactivity of said proteins toward casein so as to produce modified soluble proteins, combining said casein, said modified soluble proteins and cheese ingredients which comprise fat to form a mixture, plasticizing the mixture to form said pasta filata cheese. Not being the product a "real" cheese, in this procedure it is necessary to add ingredients for providing an organoleptic nature similar to that of the original pasta filata, and said ingredients must be added prior to the filatura step.

None of these literatures thus provide a dairy product comprising pasta filata cheese having ingredients homogenously distributed and bound therein, said ingredients being added during the filatura step.

SUMMARY OF THE INVENTION

Accordingly, object of the present invention was to provide a new dairy product comprising pasta filata cheese that, while maintaining the characteristics of known foodstuffs, had a different and more tasty flavor without however altering the organoleptic properties inherent with the various specialties already available on the market, had superior properties as far as freshness, flavor and structure are concerned, and also exhibited a lower fat content as compared to known foodstuffs (44–45%).

This aim has been, therefore, attained with a pasta filata cheese dairy product exhibiting a nutritional value and overall freshness features that are different and original as compared to those of similar foodstuffs present on the market, said dairy product comprising pasta filata cheese to which selected ingredients during the filatura step have been added, which are able to modify the taste thereof while keeping the typical characteristics of these foodstuffs unchanged. This addition occurs during the foodstuff preparation steps, that is from the milk preparation to the foodstuff stiffening, these procedures being well known to the persons skilled in the art.

However, the adopted features require particular modalities that could not be foreseen at the present state of the art. The ingredients added during the working can herein be in the form of pieces, as juice, paste, puree, extracts, concentrates etc. and be natural or synthetic, simple or composite. Anyway, the final result is a foodstuff having a new taste even though its appearance is quite similar to normal pasta filata cheese products.

The present invention relates accordingly to a dairy product comprising pasta filata cheese to which, in order to modify the flavor and taste thereof at will, simple or composite, natural or synthetic ingredients of vegetable and/or animal source, selected from the group consisting of fruit, vegetables, meat, spices, farinaceous food, greens, and the like have been added during filatura step.

In the new foodstuff object of the present invention it has been proved useful to vary the protein form relative to the one available in the milk source by utilizing powdered low-fat/whole milk, serum proteins, different types of casein, and casein compounds. Likewise, is has been proved to be useful to vary the lipidic phase by adding animal and/or vegetable fats (either cream or margarine or oils).

Furthermore, in order to make the taste of the final product still more agreeable, the addition of milk ferments of different strains, natural flavors, colouring agents, bleaches, preserving agents, acidifiers, salt, and sugar, besides the typical ingredients for achieving the desired taste/flavor, has proved to be useful.

It is a further object of the invention a process for preparing the above dairy product containing pasta filata cheese and ingredients, said process comprising, in addition to the step involving the ingredient preparation which can be considered as a side step, five main steps, i.e.: a) preparation of the milk source, b) preparation of the curd, c) preparation of the foodstuff, d) completion of the foodstuff and finishing touch, and e) packaging.

For the new foodstuff the Applicants have selected a type of mixture able to ensure the harmonic and synergistic combination of pasta filata cheese (kneaded and stretched curd) and ingredients capable of giving the finished product particular and coherent organoleptic features making it distinguishable from all foodstuffs existing on the market.

The particular preparation technology enables a new dairy product to be obtained having a peculiar savoriness, a gustative appeal and distinguishable characteristics that make it particularly desirable and attractive, even if, should it be desired, it may have a lower fat content.

DESCRIPTION OF THE PREFERRED EMBODIMENT

General Procedure

Step a): starting from cow's milk or buffalo milk, or mixed milk having a 0-10% fat content and 2.5-5% protein content, after filtration, the milk is optionally pasteurized following usual procedures or submitted to ultrafiltration, microfiltration and other similar procedures. Once the milk source characteristics have been determined, the milk is brought to a temperature of 33°-37° C. Then the addition of cultures of bacteric and/or selected ferments is carried out, which operation generally takes place 20-30 minutes before the addition of rennet so as to give the milk a mass of very active microorganisms that can give fermentation the desired orientation at once.

Generally, cultures of bacteria mainly consisting of *Streptococcus thermophilus* and a minor part of *Lactobacillus helvetitus*. or *Lactobacillus bulgaricus* are used. The acidity of said bacteria cultures added to the milk at the rate of 2-3%, ranges from 14° to 24° SH/50 ml. It is however also possible to act in such a manner that the acidifying action carried out by milk ferments is replaced by the addition of organic acids to the milk. This addition must take place in such a way to avoid concentration gradients that can give rise to the formation of flocculations. It is therefore suitable to undertake a slow addition of acids suitably diluted in water to the milk remaining under constant and quick stirring. Acetic acid or citric acid may be considered as appropriate and the pH value ranges from 5.5 to 5.8.

Step b): to the milk thus obtained, rennet of various titre and characteristics and in variable doses is then added. Curdling takes place at a temperature of about 33°-37° C., it requires a period of time of about 45 minutes and enables a soft but elastic curd to be achieved. In any case, rennet amount and curdling temperature and time may vary depending on the milk characteristics and on the particular features to be achieved in the finished product.

After the soft gel (curd) hardening step, the curd was cut. The first cutting together with a short rest (5 to 10 minutes) enables the whey drain off to start. Then there is a second cutting. The final result is a curd suspension consisting of grains of variable size depending upon the desired final product. Eventually, the curd may be allowed to settle on the boiler bottom in order to enable it "to build itself up" and start ripening.

Step c): once ripening has occurred, the mature or nearly mature curd is cut/ground/crumbled until blocks having size ranging between 1 mm$^3$ and 8 cm$^3$ have been obtained. Then ingredients, salt and hot water (60°-95° C.) are added and the mixture is kneaded and stretched so as to have a uniform mixing of the ingredients in the medley/paste.

Step d): during this step the curd is dipped in hot water so that the paste may reach the appropriate temperature for stretching into rope-like strands (filatura). The produced acidity sequestrates calcium contained in the casein reticule giving thereby rise to a demineralization process bringing about the disintegration thereof. This phenomenon enables the casein reticule lamellae to slide upon one another so that the paste can freely "stretch" thereby incorporating the ingredients holding them therein. Once the desired kneading and stretching degree has been reached, further ingredients can be optionally added again and the foodstuff is then shaped, chilled in cold water and stiffened depending upon the desired final product. Optionally, it may be dipped into a brine having a salt content of 9-10% for achieving the desired salting, then it is ripened and optionally smoked.

Step e): this packaging stage takes place following procedures suitable for preserving this type of foodstuff.

It should be particularly stressed that the addition of ingredients during steps c) and d) is a completely new procedure, and it was absolutely unexpected that these additions either would not have adversely affected the pasta filata process or would have enabled all the same the achievement of a foodstuff similar to those already on the market while offering at the same time a completely new and agreeable taste.

EXAMPLE

Preparation of the Milk Source

Raw milk having a 3.5% fat content stored at a temperature of 4° C. is cleaned and adjusted so as to bring it to the desired fat and protein content. Milk is then pasteurized and outgassed using appropriate equipments (in order to eliminate therefrom all present smells). Afterwards milk is cooled to the inoculation temperature (35° C.) and introduced into ripening tanks provided with sterile overpressured air and previously sanitized using water heated to 85° C.

Preparation of the Curd

Inoculation at the overall rate of 1-3% takes place with milk ferments of different mesophile and thermophile strains. Then liquid rennet is added at a titre of 1:10000 in a proportion of 10-40 ml per 100 liters of milk at pH 6.4. Brief stirring is carried out, then the mixture is allowed to rest and, once the desired consistency has been reached, the curd cutting is executed. The average preparation time is included between 60 and 180 minutes.

Preparation of the Foodstuff

To this "semifinished" product (curd) cut into pieces and ground to give blocks having size of from 3 $mm^3$ to 8 $cm^3$ (at the rate of 1 to 50%), mixtures previously prepared were added and comprising for example:
  tomato, cream, oregano, basil, salt;
  salmon, salt, cream;
  strawberries, cream, salt;
  frankfurters, cream, salt;
  tomato puree, sugars, salt, spices, apple vinegar;
  sauerkraut and optionally salt;
  ground black olives, cream.

Ingredients may be specific preparations or be purchased on the market, ready for use. Said ingredients are sanitized separately and they are added in a cold state or when their temperature ranges from 10° to 40° C. Medley mixture obtained from mixing is treated following procedures and conditions enabling the ingredients to be appropriately dispersed therein.

Completion of the Foodstuff

To the mixture thus obtained hot water at a temperature of 65°-95° C. is added in order to achieve thin threads (filatura). The "filatura" liquid, that may be salted or unsalted, can be brought back into the circuit in order to avoid too great a reduction of fat and/or removal of ingredients from the cheese being stretched. Once the desired "filatura" point has been reached, the rope-like and silky mixture in which the desired ingredient has been uniformly distributed, is submitted to shaping (which can be either traditional by hand or by devices in ovals, or in blocks or in other desired shapes depending on the intended use). The filatura liquid may be per se one of the ingredients or in other cases may contain an ingredient. Subsequently chilling and stiffening in (optionally salted) water is carried out.

Packaging

Packaging can take place with or without conservation (preserving) liquid and in particular the conservation liquid of the final product may contain flavors and/or other ingredients adapted to enhance flavor.

Externally the finished product has a smooth, thin and uniform skin enabling the contained ingredients to be seen. The appearance, consistency, texture and elasticity of the finished product are quite similar to those of traditional products (mozzarella, provola, caciocavallo), apart from color which is the typical color of the added ingredients.

Obviously the above ingredient list is given by way of example only and does not intend to limit the scope of the present invention.

The described foodstuff can be used as such or for stuffing food such as pizza, savoury flans and cakes, as a filling for pasta, gastronomic preparations and sandwiches, or as a true flavouring for typical dishes such as spaghetti, macaroni and the like.

For comparison purpose, the Applicants tried to add ingredients prior to curdling step, that is not in according to the present invention. In every case the following problems have been noticed:

a) to obtain in the end-product a "mixture" of cheese and ingredients, and not a cheese with englobed ingredients, a high amount of ingredient should be employed, and the ingredients were never distributed in the cheese;

b) several ingredients are not suitable to be mixed with milk. Those having a too high specific gravity (meat) or a too light specific gravity (oregano) can not match with the milk's density and can not be retained by the curd. In other words, these ingredients do not reach a homogenous distribution in the curd and consequently in the end-product;

c) a great amount of the ingredient is wasted/dispersed within the whey and can not be recycled;

d) the whey containing the ingredient can not be used as raw material to produce for example butter or cream;

e) a major amount of the ingredient is lost during the subsequent filatura because of the dilution occurring when hot water is added;

f) with all the tested ingredients the filatura step was not possible (meat, oregano, strawberries, salmon, frankfurters, sauerkraut, tomato, olives, anchovy paste, basil).

Comparative Example 1

A cheese vat normally equipped to produce (mozzarella) pasta filata cheese with steam-jacket, standard wire curd knives, mechanical stirrer, thermometer and pH-meter, was charged with 500 l. of standardized pasteurized cow's milk having a 3.7% fat and 3.04% protein content and a pH of 6:65. The milk was heated to a temperature of 35°-27° C., and then 12.5 liters of a colture of Streptococcus thermophilus and other mesophilic ferments having a pH of 4.62 were added and the mixture was stirred for about 30 minutes. A mixture of milk and ferments was so obtained having a pH of 6:50. Eventually it could have been useful to add citric acid to reach said pH value.

After approximately 30 minutes, liquid rennet at a titre of 1:15.000 in a amount of 80 ml. per 100 liters was added to the mixture under stirring to obtain a correct dispersion in the milk.

After a rest of about 85 minutes, the curd thus obtained was cut or broken with the mechanical curd knives (10.15'). to release the whey. Acid ripening of the raw curd was carried out, by keeping the curd to ripe in the warm whey, in about 3 and half hours.

During this time part of the whey was drained off.

Packing the curd has been proved useful to help the whey draining off and to maintain the curd at the right and constant temperature for ripening.

As the curd reached a pH of 5.2-5.4, it is chopped in 5-8 $mm^3$ small cubes and made plastic by heating, kneading, stretching and melting it in hot water (92° C.), immediately followed by mechanical forming and cooling/hardening in cold water to obtain a pasta-filata cheese.

Addition of smoked salmon cut into little pieces and having a temperature of 30°-35° C. took place in the forming step.

The pasta-filata cheese did not absorb all the salmon added but only few pieces of salmon were inglobated in the external layer and, on the other hand, in the internal layers there were only some light pink colored spots. At the end a huge amount of salmon was observed in the water.

Comparative Example 8

Comparative example 1 was repeated except that oregano was used instead of salmon. The cheese revealed a light oregano small and leaves were found clustered in lumps on the external layer of the cheese instead of being homogenously distributed in it. However a big amount of leaves was found in the water.

Comparative Example 3

Following the same procedure as described in comparative example 1, but using frankfurters cut in little pieces and mashed frankfurters instead of salmon, a pasta filata cheese was obtained having spots of a light brown colour not homogenously distributed in the cheese, and the ingredient was recovered from the cooling liquid.

Comparative Example 4

In a vat as described in comparative example 1, 1000 liters of cow's milk having a 3:56% fat and a 3:04% protein content and pH of 6:74 were charged. The milk was heated to a temperature of 35°-27° C., and then 22.5 liters of a culture of Streptococcus thermophilus and other mesophilic ferments having a temperature of 34° C. were added and the mixture was stirred for about 20 minutes. A mixture of milk and ferments was so obtained having pH of 6:45.

After approximately 10 minutes tomato cubes, mashed tomatoes and oregon were added to the fermented milk and stirred. After 10 minutes, rennet at a titre of 1:15.000 in a amount of 20 ml. per 100 liters was added to the mixture under stirring to obtain a correct dispersion in the milk.

After a rest of about 100 minutes, the curd thus obtained was cut or broken with the mechanical curd knives (10-15'') to release the whey. Acid ripering of the raw curd was carried out, by keeping the curd to ripe in the warm whey, in about 4 and half hours.

During this time part of the whey was drained off.

As the curd reached a pH of 5.2-5.4, it is chooped in 5-8 $mm^3$ small cubes and made plastic by heating, kneading, stretching and melting it in hot water (90°-95° C.), immediately followed by mechanical forming and cooling/hardening in cold water to obtain a pasta-filata cheese.

The pasta filata cheese did not absorb at all the pieces of tomatoes nor the oregano added but only a little amount of tomato juice was found in the cheese. A huge amount of tomato mash and the total amount of oregan and tomato cubes were, at the end observed in the whey, that was heavily red colored.

Comparative Example 5

Comparative example 4 was repeated but employing chopped black olives and pepper respectively instead of tomato cubes and oregano. Apart from color, the same negative results have been obtained.

EXAMPLE 6

According to U.S. Pat. No. 4,919,943

The equipment used in this example was the same as employed in the previous examples. According to YEE at al. patent, ferments culture was not added. The same technologies (Ultrafiltration, Diafiltration, microfiltration, high temperature treatments, centrifuge separation and freeze drying) used by YEE et al. were used to concentrate/produce the casein fraction and/or the modified whey protein fraction before cambining them with other cheese ingredients, eventually followed by the addition of rennet.

The whey protein fraction powder was mixed with the casein fraction and the other cheese ingredients (YEE at al. describes these "other ingredients" as plastic cream, salt and water).

As in the US patent it is stated that the ingredients must be added prior to the plasticizing step, and this is the "curdling" step because rennet has been used, fresh tomatoes cut in pieces, tomato juice and oregon and parsley were added to the mixture with the whey powder and the concentrated casein fraction, plastic cream, salt and water. In other runs fruits or salmon were added.

Some of the ingredients used had a too high specific weight (salmon pieces) and others a too light specific weight (parsley) in comparison to the mixture so that they were not homogeneously distributed in the final product only by using the Rietz cooker with its auger, in batch.

Owing to the high temperature (165°-200° F.) and the high auger speed, used by YEE at al. to plasticize the mixture, the final product revealed to be a sort of melted dough cheese and not a fresh pasta filata cheese as the wellknown "italian mozzarella" or the other typical italian pasta filata cheese. In this melted cheese some of the ingredients (fresh fruits or tomatoes or salmon) were used in cut pieces but it was not possibile to recover pieces because they were as mushy in the cheese paste.

In the final product the cooked ingredients in the cheese didn't revealed their original flavor, because of the water and flavor evaporation, even if the apparent result (color of the mixture) seemed to be positive.

The final product is a pasta filata-type cheese that was melted at high temeparture and without using waters as in traditional mozzarella. Evaporated or separated flavors cannot be re-added during plasticizing bacause it is stated that ingredients must be added prior to plasticizing step.

It is possible to use this melted cheese (with a "good acceptable performace on baked pizza in terms of functional requirements") as pizza-cheese but it has nothing similar to the original fresh typical mozzarella (in fact it is a pasta filata-type cheese).

It is a matter of course that YEE et al. patent is intended to produce a cheese similar to pasta filata cheese used for pizza baking (pasta filata-type cheese versus original mozzarella) and do not consider flavoring ingredients added to produce a flavored mozzarella.

The prior attempt was to "produce pasta filata-type cheese incorporating high levels of soluble proteins, such as, whey proteins, and having functional characteristics, acceptable for use as a topping on baked pizza" (YEE et al. U.S. Pat. No. 4,919,943 page 2, lines 61-66).

It is possible to see that the ingredients adding occurs in different steps of the process due to the different aims that is pursued: Applicant's invention aim to create a new taste in traditional pasta filata cheese; YEE et al. aim to reproduce a pasta filata-type cheese with the original pasta filata cheese taste.

EXAMPLE 7

According to U.S. Pat. No. 4,919,943

The equipment used in this example was the same as employed in the previous examples. According to YEE at al. patent, ferments culture was not added and the same technologies (Ultrafiltration, Diafiltration, microfiltration, high temperature treatments, centrifuge separation and freeze drying) used by YEE et al. were used to concentrate/produce the casein fraction and/or the modified whey protein fraction to combine them with other cheese ingredients (plastic cream, salt and water), eventually followed by the additional of rennet. Flavoring ingredients, other than plastic cream and salt used by YEE et al., were added in the milk before casein and whey concentration. The final product revealed the used ingredients only in a very small amount by a very pale color. The bigger part pf the ingredients was recovered in the components separated from the casein and the whey by UF and the other technologies. The final product is to be considered negative.

What is claimed is:

1. A multi-flavored dairy pasta filata cheese having live lactic acid bacteria; and
   from 1 to 50% by weight, based on the pasta filata total weight, of ingredients homogeneously distributed, dispersed and intimately incorporated in said cheese, said ingredients being added to a filata curd during a filatura step, and said ingredients being selected from the group consisting of fruit, vegetables, meat, spices, and mixtures thereof.

2. A dairy product according to claim 1, wherein said ingredients are in the form of pieces, juice and mash, and which can be added to the filata curd during a filatura step in a cold state or after being heated at a temperature of from 10° to 40° C.

3. A dairy product according to claim 1, wherein the ingredients added to the pasta filata type cheese comprise:
   tomato, cream, oregano, basil, salt;
   salmon, salt, cream;
   strawberries, cream, salt;
   frankfurters, cream, salt;
   tomato puree, sugars, salt, spices, apple vinegar;
   sauerkraut and optionally salt;
   ground black olives, cream.

4. The filata cheese of claim 1 wherein said vegetables are farinaceous food and greens.

5. A process for making a pasta filata cheese comprising
   preparing from milk a ripened non-artificial pasta filata cheese curd, chopping or grinding the curd into pieces of from about 3 $mm^3$ to 8 $cm^3$, mixing ingredients selected from the group consisting of fruit, vegetables, meat, spices, and mixtures thereof with said filate cheese curd at a temperature of about 10° to 40° C. to provide a medley curd mixture,
   adding filatura liquid having a temperature of 65°-95° C. to the medley curd mixture, and
   stretching the medley curd mixture in the filatura liquid to produce a flavored pasta filata cheese.

6. The process of claim 5 wherein milk is treated to prepare said milk for preparing a pasta filata cheese by inoculating the milk with lactic acid bacteria at a rate of 1-3%, adding liquid rennet at a titre of 1:10,000 in an amount of 10 to 40 ml per 100 liters of milk and producing said filata cheese curd containing live lactic acid bacteria; and producing said flavored pasta filata cheese to have live lactic acid bacteria therein.

7. The process of claim 6 further comprising the steps of forming, cooling, hardening and packaging the filata cheese.

8. The process of claim 6 wherein stretching in the filaturing step is carried out at a temperature of from 60° to 95° C.

9. The process of claim 6, wherein ingredients are added in an amount of 1-50%, based on the amount of pasta filate cheese, said ingredients being selected from the group consisting of:
   tomato, cream, oregano, basil, salt;
   salmon, salt, cream;
   strawberries, cream, salt;
   frankfurters, cream, salt;
   tomato puree, sugars, salt, spices, apple vinegar;
   sauerkraut and optionally salt;
   ground black olives, cream.

10. The process of claim 6, wherein the ingredients are added in a cold state or after being heated to a temperature of from 10° to 40° C.

11. The process of claim 6, wherein the lactic acid bacteria are selected from the group consisting of *Streptococcus thermophilus, Lactobacillus helveticus* and *Lactobacillus bulgaricus* in an amount of 1-3%, based on the amount of the milk.

12. The process of claim 5 wherein said vegetables are farinaceous food and greens.

* * * * *